United States Patent
DeLaRosa et al.

(10) Patent No.: US 7,095,885 B1
(45) Date of Patent: Aug. 22, 2006

(54) METHOD FOR MEASURING REGISTRATION OF OVERLAPPING MATERIAL LAYERS OF AN INTEGRATED CIRCUIT

(75) Inventors: Eugene A. DeLaRosa, Boise, ID (US); Troy V. Gugel, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/516,581

(22) Filed: Mar. 1, 2000

(51) Int. Cl.
*G06K 9/00* (2006.01)

(52) U.S. Cl. .............................. 382/151; 348/86; 435/7
(58) Field of Classification Search ................. 382/151
See application file for complete search history.

(56) References Cited

U.S. PATENT DOCUMENTS

| | | | |
|---|---|---|---|
| 4,766,311 A | 8/1988 | Seiler et al. | 250/252.1 |
| 4,772,846 A | 9/1988 | Reeds | 324/158 F |
| 4,938,600 A * | 7/1990 | Into | 356/401 |
| 4,989,082 A * | 1/1991 | Hopkins | 382/151 |
| 5,298,975 A | 3/1994 | Khoury et al. | 356/375 |
| 5,479,252 A | 12/1995 | Worster et al. | 356/237 |
| 5,498,500 A | 3/1996 | Bae | 430/22 |
| 5,617,340 A | 4/1997 | Cresswell et al. | 364/571.01 |
| 5,701,013 A | 12/1997 | Hsia et al. | 250/491.1 |
| 5,776,645 A * | 7/1998 | Barr et al. | 430/22 |
| 5,790,254 A | 8/1998 | Ausschnitt | 356/372 |
| 5,835,225 A | 11/1998 | Thakur | 356/381 |
| 5,847,818 A | 12/1998 | Lin et al. | 356/124.5 |
| 6,068,954 A * | 5/2000 | David | 430/22 |

* cited by examiner

*Primary Examiner*—Brian Werner
(74) *Attorney, Agent, or Firm*—Dickstein Shapiro Morin & Oshinsky LLP

(57) ABSTRACT

A method and apparatus for measuring registration between two or more integrated circuit layers is disclosed. Images of actual operative circuitry of different layers of a semiconductor wafer, obtained by an optical technique or a scanning electron microscope, are digitized and analyzed for the relative placement of pattern shapes of the corresponding layers. This relative placement is then compared to tolerance values and if out of tolerance misregistration of the two layers is indicated.

36 Claims, 5 Drawing Sheets

METHOD FOR MEASURING REGISTRATION OF OVERLAPPING MATERIAL LAYERS OF AN INTEGRATED CIRCUIT

FIELD OF THE INVENTION

The present invention relates to semiconductor processing, and in particular, to a method for measuring the registration between two or more integrated circuit layers.

BACKGROUND OF THE INVENTION

Semiconductor-based integrated circuits are typically manufactured through the formation of a set of layers on a wafer containing many integrated circuit areas that are later separated into individual dies. Very thin layers of material are deposited one on top of the other in patterns and processed to form integrated circuit components.

One technique of deposition and patterning is photolithography where a material layer is first coated with a light-sensitive photoresist. The photoresist is exposed through a pattern mask of a desired circuit pattern. Depending upon the type of photoresist used, the exposed photoresist is developed to remove either the exposed or unexposed resist. Etching and/or deposition processes are then used to create the desired circuit within the pattern created.

In most cases, the pattern mask should be precisely aligned on a wafer during processing. The overlay of the mask, the measure of how accurately the pattern mask is aligned, will often determine whether the wafer will be functional or must be discarded. Because each wafer may undergo numerous photolithography processing steps, the alignment of each pattern mask, especially the last ones used, is dependant upon the correct alignment of earlier masks. Poor overlay may destroy the intended electrical properties of a circuit device on a wafer.

A common practice in registration, or matching in position, of overlying layers in a semiconductor wafer is to use metrology structures such as registration patterns or marks in each layer of the wafer in regions outside of a circuit region. In particular, the box-in-box registration pattern is commonly used today. This technique employs squares of different sizes on the layers to be registered. When the two layers are exactly matched in position, or registered, the squares are concentric. Any registration error produces a displacement of the squares relative to each other. To ensure ideal registration between masks, four box-in-box alignments are typically performed simultaneously, with the boxes located at the four corners of the image field.

Since semiconductor devices are expensive to fabricate, it is desirable to verify registration after the application of each layer. If the displacement of the layers is outside tolerable limits, sometimes the defective layer can be removed or replaced with an accurately registered layer. In other cases, the substrate is discarded so that further processing steps are not performed on a defective substrate. In any event, significant registration errors must be noted and corrected, otherwise subsequently fabricated wafers would likely have the same registration errors.

In the prior art, monitoring and verification of registration was done manually. Laboratory operators using microscopes examined the registration of overlying layers on each semiconductor wafer. Unavoidably, this technique was slow, subject to human errors and capable of producing substrate contamination.

Recently, the registration of overlying layers has been measured by automated systems, such as optical microscopy and scanning electron microscopy (SEM). For example, registration errors can be measured by a process in which an image of a set of registration patterns, such as box-in-box, recorded by a video camera through a microscope, are processed to obtain a measurement of the registration error.

As feature sizes and the alignment requirements of semiconductor devices shrink, the lens distortion of the exposure system has a larger impact on the alignment budget. Alignment errors due to lens distortions have been shown to be dependent on feature size and pitch. This size and pitch dependency can induce a measured alignment offset difference between the standard box-in-box method and the actual circuit layers of interest.

Accordingly, a method for measuring displacement between layers of a semiconductor wafer, which is inexpensive to implement, fast in operation and simple to automate is needed. There is also a need for a method that allows accurate measurement of layer registration errors, while avoiding the systematic errors associated with the prior art measurement systems.

SUMMARY OF THE INVENTION

The present invention provides a method and apparatus that overcome some of the problems associated with registration measurements.

The present invention utilizes optical or scanning electron microscopy images of two or more overlying integrated circuit layers. The portion of the integrated circuit layers that is imaged contains the actual operative circuitry of the chip. The respective images are digitized and the digitized patterns are further analyzed for the relative placement of the two layers. The measured offset of predetermined features in the layers can then be compared to a database containing previously computed data for what the feature offset should be in the two layers. The difference between the imaged and the ideal placement, if outside a tolerable limit, is then used to correct processing errors or inefficiencies in the subsequent fabrication of other wafers.

The above and other advantages and features of the present invention will be better understood from the following detailed description of the preferred embodiment which is provided in connection with the accompanying drawings.

DETAILED DESCRIPTION OF THE PREFERRED EMBODIMENTS

In the following detailed description, reference is made to various specific embodiments in which the invention may be practiced. These embodiments are described with sufficient detail to enable those skilled in the art to practice the invention, and it is to be understood that other embodiments may be employed, and that structural, electrical and methodology changes may be made without departing from the invention. Accordingly, the following detailed description is not to be taken in a limiting sense and the scope of the present invention is defined by the appended claims.

The present invention provides a method for measuring registration between overlying layers of a semiconductor wafer. The registration method measures the displacement of the actual patterns on the scanned semiconductor layers, rather than that of metrology structures such as, for example, the set box-in-box pattern.

Figure 1:
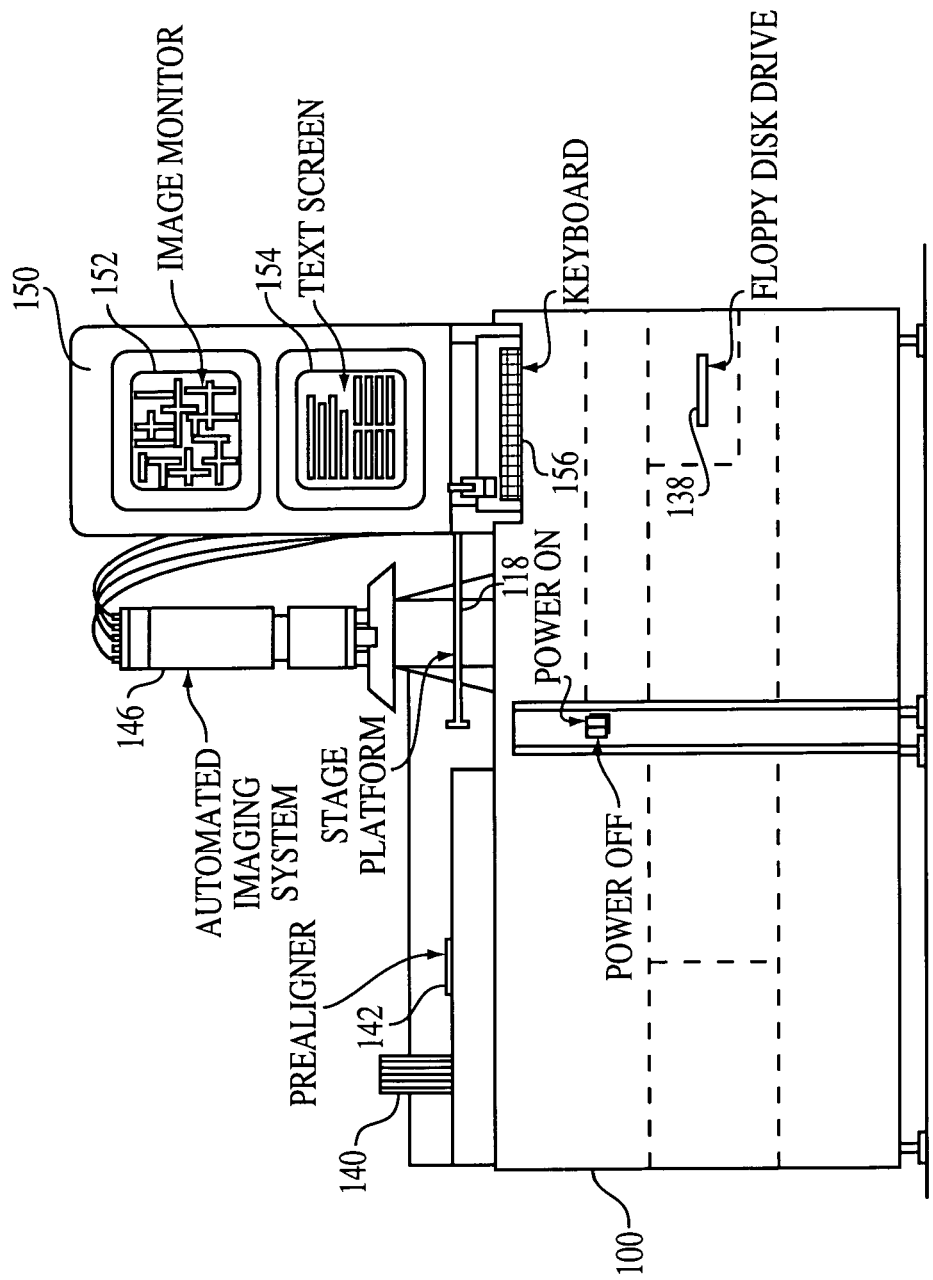
FIG. 1 illustrates a registration measurement system according to one embodiment of the present invention.
Figure 2:
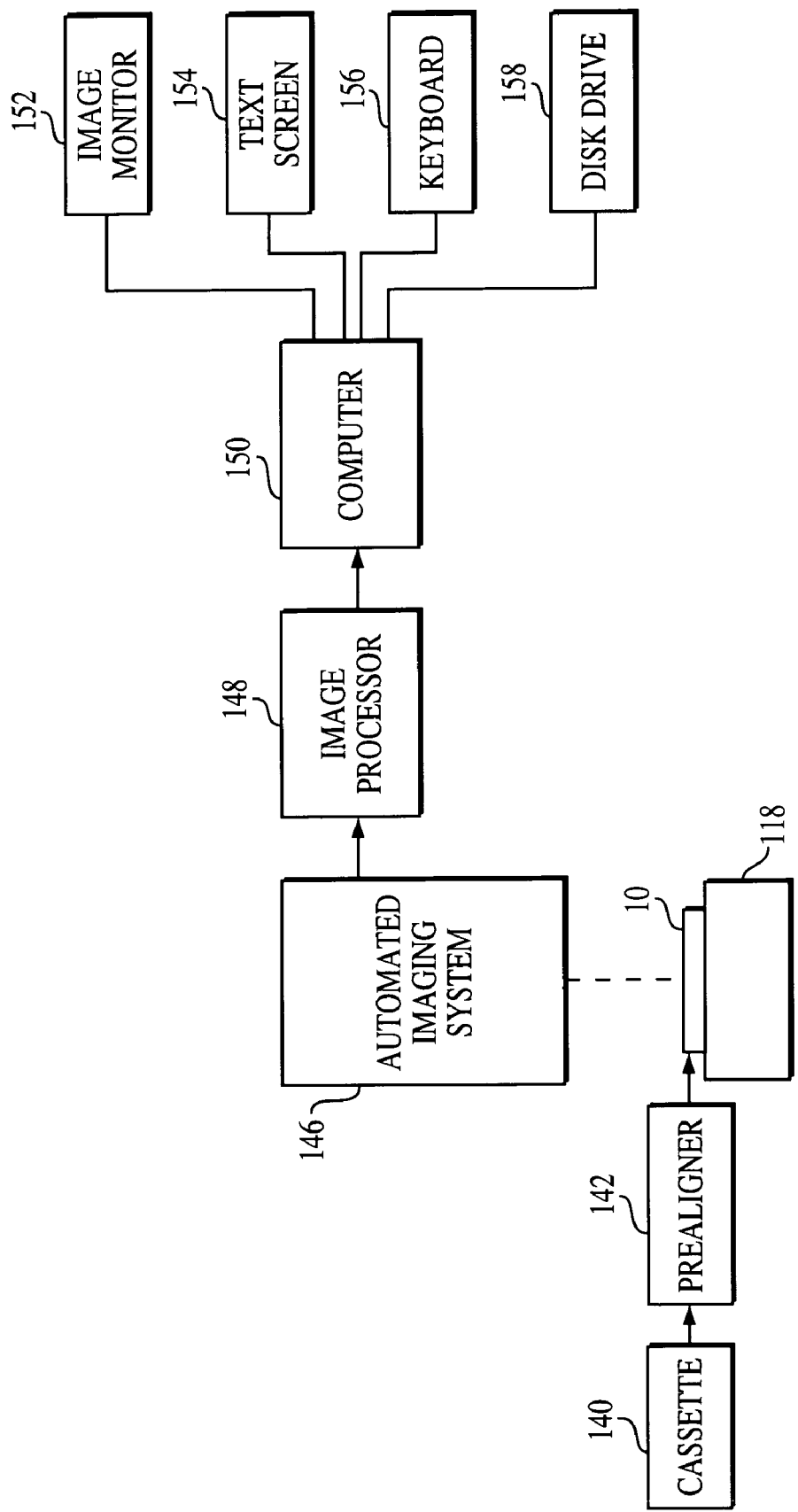
FIG. 2 is a block diagram of the illustration of FIG. 1.

The present invention is implemented in a semiconductor device imaging system 100, an exemplary one being shown in FIGS. 1 and 2. The system 100 includes a prealigner 142 for handling cassette wafer holder 140, an automated imaging system 146, an image processor 148, and a computer 150 which further comprises one or more processors and associated memory, an image monitor 152, a text screen 154, a keyboard 156, and a disk drive 158.

As illustrated in FIGS. 1 and 2, cassette wafer holder 140 contains semiconductor wafers to be measured and is mounted on system 100. A wafer transport system or a wafer handler (not shown) removes a semiconductor silicon wafer 10 from cassette 140 and places it on prealigner 142. A typical wafer transport system is a model CKG1 or CKG3 available from FSI. Semiconductor wafer 10 has a given size, typically ranging from 75 mm (3 inches) to 200 mm (8 inches) in diameter.

The wafer transport system further transfers semiconductor silicon wafer 10 from the prealigner 142 onto stage 118. Stage 118 can move in three dimensions and permits the positioning of semiconductor wafer 10 relative to the automated imaging system 146. Stage 118 may be any conventional device, such as a piezoelectrically driven stage, that provides precise movement over a broad range of distances.

The automated imaging system 146 may be either an optical system or a scanning electron microscope (SEM), both being used in the present invention for generating aerial images of wafer 10.

The optical system could include a microscope and a video camera positioned above semiconductor wafer 10. The microscope could carry objectives ranging in power from 2.5× to 200× magnification. For example, the microscope of the optical system could be a Zeiss Axiotron type and the video camera a Dage MT168 series.

Similarly, the present invention could use a scanning electron microscope (SEM) as the imaging system 146. As described in the background section of this application, a conventional SEM focuses an emitted electron beam toward the semiconductor wafer 10.

Figure 3:
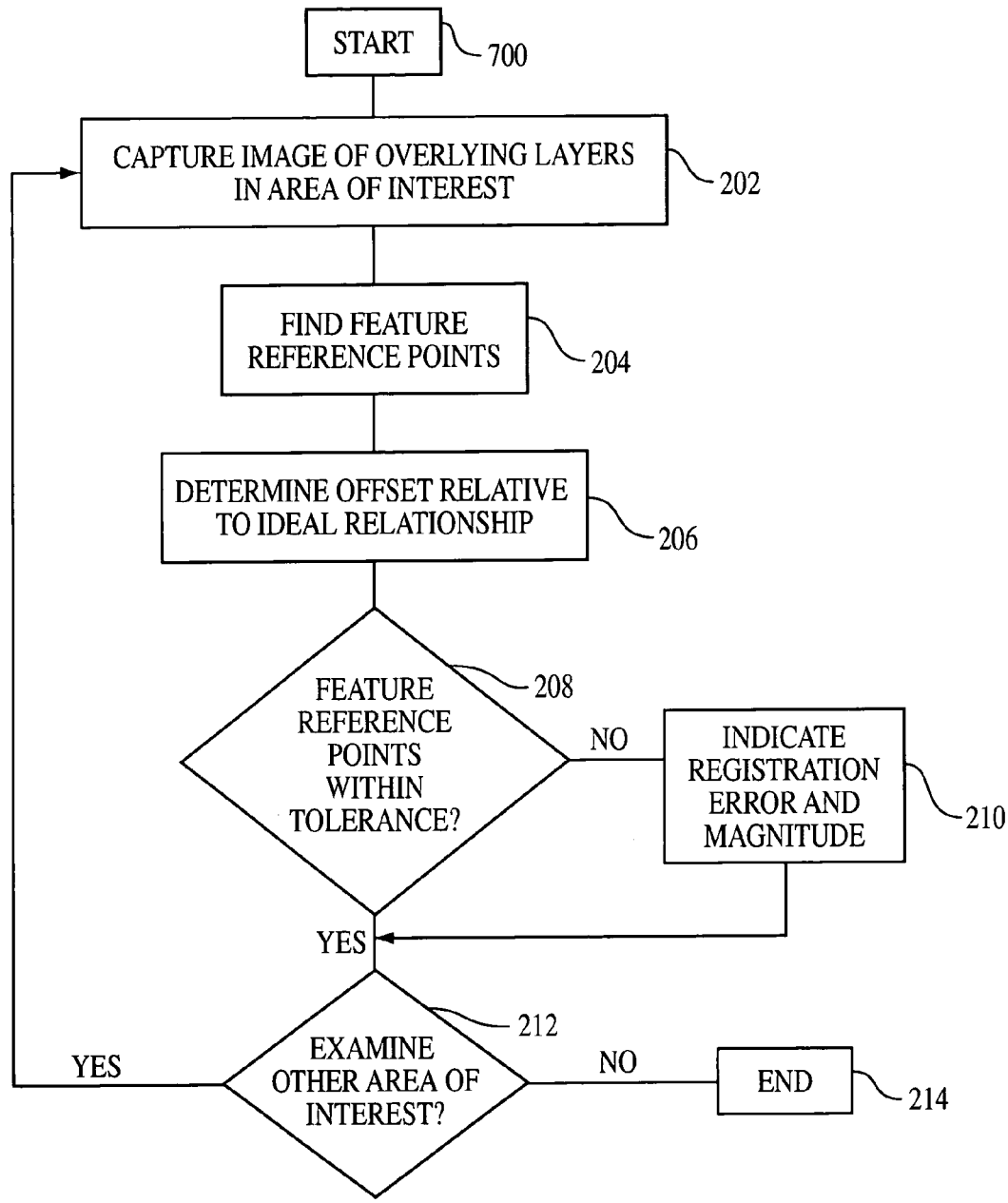
FIG. 3 is a flow diagram of the registration steps in accordance with the present invention.

Referring now to FIG. 3, a process for measuring material layer registration in a semiconductor device using the equipment shown in FIGS. 1 and 2 will now be described. After a system initialization at step 200, step 202 begins with the automated imaging system 146 taking a top-down image of a semiconductor wafer 10 at a predetermined step in the fabrication process and at a predetermined area of the circuit which may be user selectable. This image includes features of two or more layers of the wafer combined in a single top-down image. For purposes of simplification, we will assume that two material layers, a first and a second, are imaged. The first individual layer will have at least one predetermined featured reference point in the image.

Figure 4:
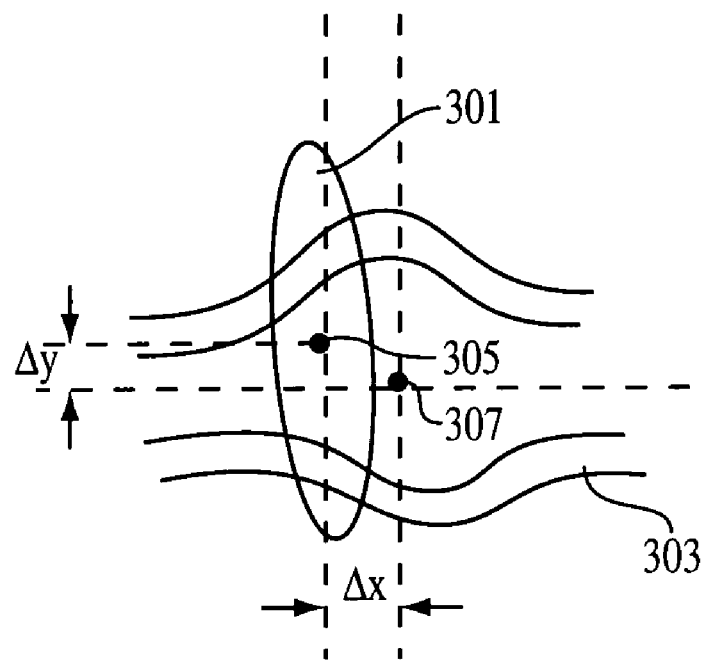
FIG. 4 represents features of such overlying material layers in a semiconductor device which is useful in explaining the invention.

For example, if the printed feature is a circular feature, the reference point might be the radial center of the radius of curvature of the feature or it could be a predetermined location along the edge of the feature. The reference point could also be a centroid of a feature or have some other spatial relationship to one or more features of the layer. Likewise, the second individual layer, which overlies the first will also have a predetermined feature reference point in the image. FIG. 4 is a simplified drawing illustrating respective features 301 and 303 in two overlaid material layers in the aerial image. A predetermined feature reference point for feature 301 can be the center point 305, while a predetermined feature reference point for feature 303 can be a radial center point 307.

Figure 5:
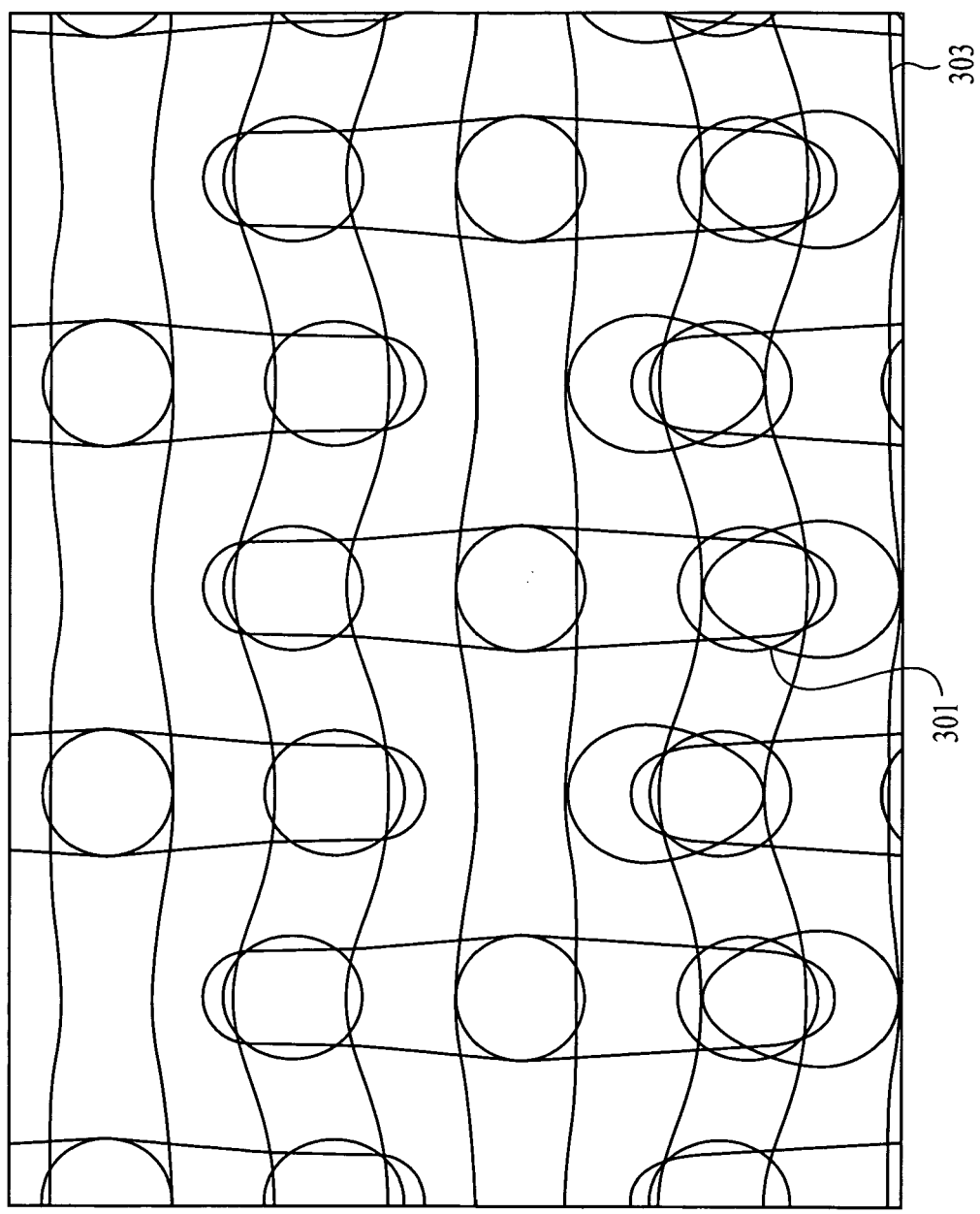
FIG. 5 illustrates an aerial image 2D contour of the overlying material layers of FIG. 4.

Although FIG. 4 shows positions of two features, each having an associated reference point, it should be appreciated that additional features and associated reference points can be used in each material layer, as exemplified in the aerial image taken in FIG. 5. Also, although FIG. 3 shows one reference point for each feature, it should be apparent that multiple reference points can be used for each feature of each layer.

The degree of alignment of the two layers is represented by the degree of alignment of the feature reference points. Taking the example shown in FIG. 4, if the two featured reference points 305 and 307 are supposed to overlap when the material layer containing feature 301 is properly aligned with the material layer containing feature 303, the degree of non-overlap of the reference points in the X and Y directions of a rectangular coordinate system represents the degree of misalignment of the two layers. That is, the values $\Delta x$ and $\Delta y$ in FIG. 4 represent the degree of misalignment of the two layers.

Following the capture of a top-down image of at least two overlying material layers in step 202, the process proceeds to step 204 where the feature reference points in the two material layers are located. The reference points can be located by an analysis of the images captured themselves that is, taking FIG. 3 as an example, computer 150 takes the image from image processor 148 and finds the center points 305 and 307 of the respective features 301 and 303 of the two overlapping material layers. Once the reference points are located the process proceeds to step 206, where the relative locations of those reference points in an ideal wafer is used as a basis for comparison with the actual locations of the featured reference points found in step 204.

The ideal relationship of the compared feature points can be found in the original design specifications for the circuit portion under examination, or can be found from a previously imaged circuit where the reference points were in perfect alignment. In either case, at step 206 the computer determines whether the featured points, for example, 305 and 307 in FIG. 3, are in the proper relationship, which would indicate proper alignment of the two material layers. If the two featured reference points are not in the alignment they are supposed to be in, as determined from the database or ideal image, the degree of offset of the two is noted in a rectangular coordinate system and represented by a $\Delta x$ and $\Delta y$ value from where these two reference points are supposed to be located.

In FIG. 4, for example, the reference points 305 and 307 are supposed to exactly overlap so that the degree of offset is easily represented by a $\Delta x$ and $\Delta y$ value. This $\Delta x$ and $\Delta y$ value represents then the degree of offset between the two material layers.

The process then proceeds to step 208 to determine whether any offset that has been determined between the reference feature points is within a tolerable limit. If not, a registration error is indicated in step 206 and the magnitude of that error is noted. This can be in the form of a computer record which is generated, as well as an image presented on the image monitor 152 showing the degree of error on an actual depiction of the image under investigation. Likewise, an offset of this magnitude can be displayed on text screen 154 and recorded on a recording medium by disc drive 158.

If the featured reference points are within tolerable limits of step 208, and in any event once step 210 is completed, the process returns to step 212 where the process determines whether there are other areas of interest on the captured image that need examination. If so, the process proceeds from step 212 back to step 202, and another area of the image under consideration is then inspected and the process steps repeated. If at step 212 there are no other areas of interest for examination, the process proceeds to an end step 214.

Thus, the invention allows for a determination of a degree of misalignment of overlapped layers of an integrated circuit by actual inspection of an image showing the overlapped areas with a determination of the degree of alignment or misalignment, which is based on reference points provided in each of the two layers. As a consequence, the degree of misregistration of overlying layers can be directly determined rather than inferentially determined in a quick and efficient manner, and can be used whenever overlapping registration is a criticality in material layers of an integrated circuit under fabrication.

It should be readily apparent that the present invention can be used for any overlapping material layers at any area or site in a field of an IC as long as the examined area contains features from both layers which are in the obtained images, the locations of which can be identified by associated feature reference points.

While the invention has been described in detail with reference to semiconductor wafers, it should be readily apparent that the present invention can be used with other substrates having overlapping material layers as well.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not described here, but which are commensurate with the spirit and scope of the invention. Accordingly, the invention is not to be seen as limited by the foregoing description, but is only limited by the scope of the appended claims.

The invention claimed is:

1. A method for measuring the registration between at least two integrated circuit layers, one residing over the other, said method comprising:
   generating a top-down image of a field of said at least two integrated circuit layers, each of said layers having a respective visible feature in said image;
   digitizing said image and processing said digitized image to determine a relative location of said visible feature of one of said layers, relative to said visible feature of the other of said layers;
   determining a location of a first feature reference point in said visible feature of one of said layers, and a location of a second feature reference point in said visible feature of the other of said layers, to indicate a relative location, wherein at least one of said visible features is a non-metrological structure on said one of said integrated circuit layers; and
   determining if said relative location is within stored acceptable design limits for said integrated circuit layers by comparing said relative location to said stored acceptable design limits.

2. The method of claim 1, wherein said step of determining said location of said first feature reference point in said visible feature of one of said layer includes determining an x-axis value, $X_1$, and an y-axis value, $Y_1$.

3. The method of claim 1, wherein said step of determining said location of said second feature reference point in said visible feature of another of said layer includes determining an x-axis value, $X_2$, and an y-axis value, $Y_2$.

4. The method of claim 1, wherein said step of determining said relative location further includes determining an x-axis value, $\Delta x$, and an y-axis value, $\Delta y$, where $$\Delta x = X_1 - X_2$$

$$\Delta y = Y_1 - Y_2.$$

5. The method of claim 1, wherein said step of determining if said relative location is within stored acceptable design limits includes comparing said relative location to a stored data having reference locations and tolerable limits.

6. The method of claim 5 further including the step of calculating an offset value by calculating the difference in the positions of a first reference location and a second reference location.

7. The method of claim 6 further including the step of comparing said offset value to a predetermined tolerance.

8. The method of claim 1, wherein said step of generating said image of said field is produced by an imaging system.

9. The method of claim 8, wherein said imaging system includes a scanning electron microscope.

10. The method of claim 8, wherein said imaging system includes an optical system.

11. The method of claim 10, wherein said optical system comprises a microscope and a video camera.

12. The method of claim 1, wherein said integrated circuit layers are chosen from a group of integrated circuit layers consisting of semiconductor layers, dielectric layers, and photoactive layers.

13. A system for measuring the registration between at least two integrated circuit layers, one residing over the other, said system comprising:
   an imaging system for generating a top-down of a field of said at least two integrated circuit layers, each of said layers having a respective visible feature in said image;
   means for digitizing said image and processing said digitized image to determine a location of a first feature reference point in said visible feature of one of said layers, and a location of a second feature reference point in said visible feature of the other of said layers, to indicate a relative location of said visible feature of one of said layers, relative to said visible feature of the other of said layers, wherein at least one of said visible features is a non-metrological structure on said one of said integrated circuit layers; and
   means for determining if said relative location is within acceptable design limits for said integrated circuit layers.

14. The system of claim 13, wherein said means for determining said location of said first feature reference point in said visible feature of one of said layer further determines an x-axis value, $X_1$, and an y-axis value, $Y_1$.

15. The system of claim 13, wherein said means for determining said location of said second feature reference point in said visible feature of another of said layer further determines an x-axis value, $X_2$, and an y-axis value, $Y_2$.

16. The system of claim 13, wherein said means for determining said relative location further determines an x-axis value, $\Delta x$, and an y-axis value, $\Delta y$, where $\Delta x = X_1 - X_2$ $\Delta y = Y_1 - Y_2.$ 17. The system of claim 13, wherein said means for determining if said relative location is within acceptable design limits further compares said relative location to a stored data having reference locations and tolerable limits.

18. The system of claim 17 further including means for calculating an offset value.

19. The system of claim 18, wherein said means for calculating said offset value further compares said offset value to a predetermined tolerance.

20. The system of claim 13, wherein said means for generating said image of said field is an imaging system.

21. The system of claim 20, wherein said imaging system includes a scanning electron microscope.

22. The system of claim 20, wherein said imaging system includes an optical system.

23. The system of claim 22, wherein said optical system comprises a microscope and a video camera.

24. The system of claim 13, wherein said integrated circuit layers are chosen from a group of integrated circuit layers consisting of semiconductor layers, dielectric layers, and photoactive layers.

25. A method for measuring the registration between integrated circuit layers, said method comprising:
providing a first integrated circuit layer on a semiconductor substrate, said first integrated circuit layer comprising at least a first visible feature;
providing a second integrated circuit layer over said first integrated circuit layer, said second integrated circuit layer comprising at least a second visible feature;
generating a top-down image of a field of said first and second integrated circuit layers, including said first and second visible features;
digitizing said top-down image to provide a digitized image, and processing said digitized image to determine a relative location of said first visible feature of said first integrated circuit layer, relative to said second visible feature of said second integrated circuit layer by determining a location of a first feature reference point in said first visible feature of said first integrated circuit layer, and a location of a second feature reference point in said second visible feature of said second integrated circuit layer to indicate said relative location, wherein at least one of said visible features is a non-metrological structure on said one of said integrated circuit layers; and
determining if said relative location is within stored acceptable design limits for said first and second integrated circuit layers by comparing said relative location to said stored acceptable design limits.

26. The method of claim 25, wherein said step of determining said location of said first feature reference point in said visible feature of said first integrated circuit layer includes determining an x-axis value, $X_1$, and an y-axis value, $Y_1$.

27. The method of claim 26, wherein said step of determining said location of said second feature reference point in said visible feature of said second integrated circuit layer includes determining an x-axis value, $X_2$, and an y-axis value, $Y_2$.

28. The method of claim 27, wherein said step of determining said relative location further includes determining an x-axis value, $\Delta x$, and an y-axis value, $\Delta y$, where $\Delta x = X_1 - X_2$ $\Delta y = Y_1 - Y_2.$ 29. The method of claim 25, wherein said step of determining if said relative location is within stored acceptable design limits includes comparing said relative location to a stored data having reference locations and tolerable limits.

30. The method of claim 29 further including the step of calculating an offset value by calculating the difference in the positions of a first reference location and a second reference location.

31. The method of claim 30 further including the step of comparing said offset value to a predetermined tolerance.

32. The method of claim 25, wherein said step of generating said top-down image of said field is produced by an imaging system.

33. The method of claim 32, wherein said imaging system includes a scanning electron microscope.

34. The method of claim 32, wherein said imaging system includes an optical system.

35. The method of claim 34, wherein said optical system comprises a microscope and a video camera.

36. The method of claim 25, wherein said integrated circuit layers are chosen from a group of integrated circuit layers consisting of semiconductor layers, dielectric layers, and photoactive layers.

* * * * *